United States Patent
Kennedy et al.

(10) Patent No.: US 11,983,054 B2
(45) Date of Patent: May 14, 2024

(54) SYSTEMS AND METHODS FOR GRANULAR AND SCALABLE SUBSYSTEM POWER CONTROLS, FAULT HANDLING, AND FIELD-REPLACEABLE UNIT ISOLATION IN A MODULAR ARCHITECTURE

(71) Applicant: Dell Products L.P., Round Rock, TX (US)

(72) Inventors: Jeffrey L. Kennedy, Austin, TX (US); Timothy M. Lambert, Austin, TX (US); Sanjiv C. Sinha, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 112 days.

(21) Appl. No.: 17/959,508

(22) Filed: Oct. 4, 2022

(65) Prior Publication Data

US 2024/0111348 A1 Apr. 4, 2024

(51) Int. Cl.
*G06F 11/07* (2006.01)
*G06F 1/26* (2006.01)
*G06F 13/20* (2006.01)

(52) U.S. Cl.
CPC .......... *G06F 1/266* (2013.01); *G06F 11/0745* (2013.01); *G06F 11/079* (2013.01); *G06F 13/20* (2013.01)

(58) Field of Classification Search
CPC .... G06F 1/266; G06F 11/0745; G06F 11/079; G06F 13/20
See application file for complete search history.

(56) References Cited

U.S. PATENT DOCUMENTS

| | | | | |
|---|---|---|---|---|
| 7,389,367 | B2* | 6/2008 | Baba | G06F 3/0605 710/36 |
| 9,471,234 | B2* | 10/2016 | Devarappalli | G06F 3/065 |
| 9,772,652 | B2* | 9/2017 | Lambert | G06F 1/14 |
| 10,157,074 | B2* | 12/2018 | Khemani | G06F 13/4022 |
| 10,430,351 | B2* | 10/2019 | Gupta | G06F 13/20 |
| 11,409,683 | B2* | 8/2022 | Lambert | G06F 13/4022 |
| 2013/0111075 | A1* | 5/2013 | Sato | G06F 13/4022 710/16 |
| 2014/0052309 | A1* | 2/2014 | Chandrasekhar | G06F 1/266 700/297 |

(Continued)

*Primary Examiner* — Matthew M Kim
*Assistant Examiner* — Indranil Chowdhury
(74) *Attorney, Agent, or Firm* — Jackson Walker L.L.P.

(57) ABSTRACT

An information handling system may include a host processor module comprising a host processor field programmable gate array, a management controller communicatively coupled to the host processor field programmable gate array and configured to provide out-of-band management facilities for management of the information handling system, and an interposer configured to interface between the host processor field programmable gate array and one or more peripheral devices in order to perform power management and control of the one or more peripheral device. The interposer may include a general purpose input/output extender configured to enable and control power delivery to the one or more peripheral devices and a microcontroller unit communicatively coupled to the host processor field programmable gate array and configured to perform monitoring and discovery of the one or more peripheral devices.

18 Claims, 3 Drawing Sheets

(56) References Cited

U.S. PATENT DOCUMENTS

| | | | | |
|---|---|---|---|---|
| 2014/0129855 A1* | 5/2014 | Hamdi | .................... | G06F 1/266 |
| | | | | 713/320 |
| 2017/0336856 A1* | 11/2017 | Ragupathi | ............. | G06F 1/3234 |
| 2020/0233983 A1* | 7/2020 | Robison | .................. | G06F 21/72 |
| 2020/0412558 A1* | 12/2020 | Ballard | .................... | G06F 1/266 |
| 2021/0117246 A1* | 4/2021 | Lal | ........................... | G06F 21/53 |
| 2022/0043496 A1* | 2/2022 | Beard | ..................... | H04L 12/10 |
| 2022/0350765 A1* | 11/2022 | Ballard | ................. | H04L 9/3213 |
| 2022/0353589 A1* | 11/2022 | Chawla | .................... | H04Q 9/00 |

* cited by examiner

SYSTEMS AND METHODS FOR GRANULAR AND SCALABLE SUBSYSTEM POWER CONTROLS, FAULT HANDLING, AND FIELD-REPLACEABLE UNIT ISOLATION IN A MODULAR ARCHITECTURE

TECHNICAL FIELD

The present disclosure relates in general to information handling systems, and more particularly to systems and methods for granular and scalable subsystem power controls, fault handling, and field-replaceable unit isolation in an information handling system modular architecture.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An increase in information handling systems of modularity and general-purpose interfaces that minimize connector pin count are placing limits on a number of discrete signals in and out of a system for management of power, fault handling, and isolation to a field-replaceable unit (FRU). Tunneled, serialized interfaces controlled from direct hardware logic and/or system management firmware to direct logic and microcontroller unit firmware target devices have inherent strengths and weaknesses. Hardware-to-hardware communication is often preferred to time-sensitive or critical interfaces such as power control. System management firmware to microcontroller unit targets may be utilized for less-critical or best-effort forensics.

Within a Common Compute Framework (CCF) architecture, it is often advantageous to locate power controls to be local and sized appropriately for the peripheral device that is coupled to the main board by cables with a minimum set of conductors. Accordingly, simple and robust hardware strategies and intelligent software strategies to manage power enablement, fault handling, and FRU isolation may be desirable.

SUMMARY

In accordance with the teachings of the present disclosure, the disadvantages and problems associated with existing approaches to power control in a modular information handling system architecture may be reduced or eliminated.

In accordance with embodiments of the present disclosure, an information handling system may include a host processor module comprising a host processor field programmable gate array, a management controller communicatively coupled to the host processor field programmable gate array and configured to provide out-of-band management facilities for management of the information handling system, and an interposer configured to interface between the host processor field programmable gate array and one or more peripheral devices in order to perform power management and control of the one or more peripheral device. The interposer may include a general purpose input/output extender configured to enable and control power delivery to the one or more peripheral devices and a microcontroller unit communicatively coupled to the host processor field programmable gate array and configured to perform monitoring and discovery of the one or more peripheral devices.

In accordance with these and other embodiments of the present disclosure, a method may be provided for use in an information handling system comprising a host processor module comprising a host processor field programmable gate array and a management controller communicatively coupled to the host processor field programmable gate array and configured to provide out-of-band management facilities for management of the information handling system. The method may include enabling and controlling, with a general purpose input/output extender integral to an interposer configured to interface between the host processor field programmable gate array and one or more peripheral devices, power delivery to the one or more peripheral devices. The method may also include performing monitoring and discovery of the one or more peripheral devices with a microcontroller unit communicatively coupled to the host processor field programmable gate array.

In accordance with these and other embodiments of the present disclosure, an interposer may be for use in an information handling system comprising a host processor module comprising a host processor field programmable gate array and a management controller communicatively coupled to the host processor field programmable gate array and configured to provide out-of-band management facilities for management of the information handling system, the interposer configured to interface between the host processor field programmable gate array and one or more peripheral devices in order to perform power management and control of the one or more peripheral device. The interposer may include a general purpose input/output extender configured to enable and control power delivery to the one or more peripheral devices and a microcontroller unit communicatively coupled to the host processor field programmable gate array and configured to perform monitoring and discovery of the one or more peripheral devices.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
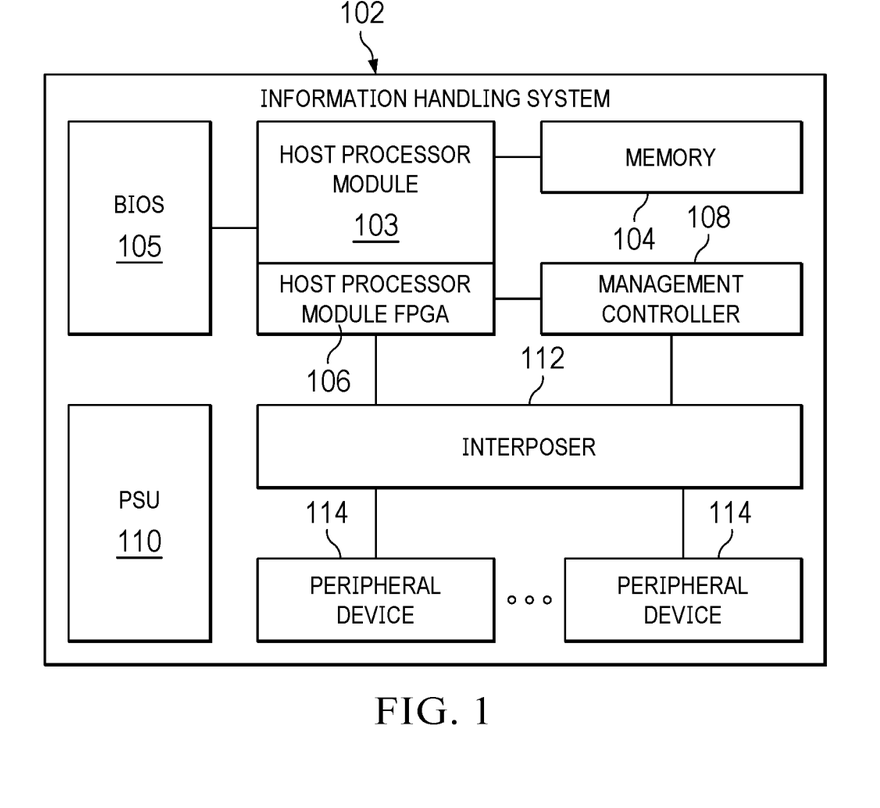
FIG. 1 illustrates a block diagram of an example information handling system, in accordance with embodiments of the present disclosure.
Figure 2:
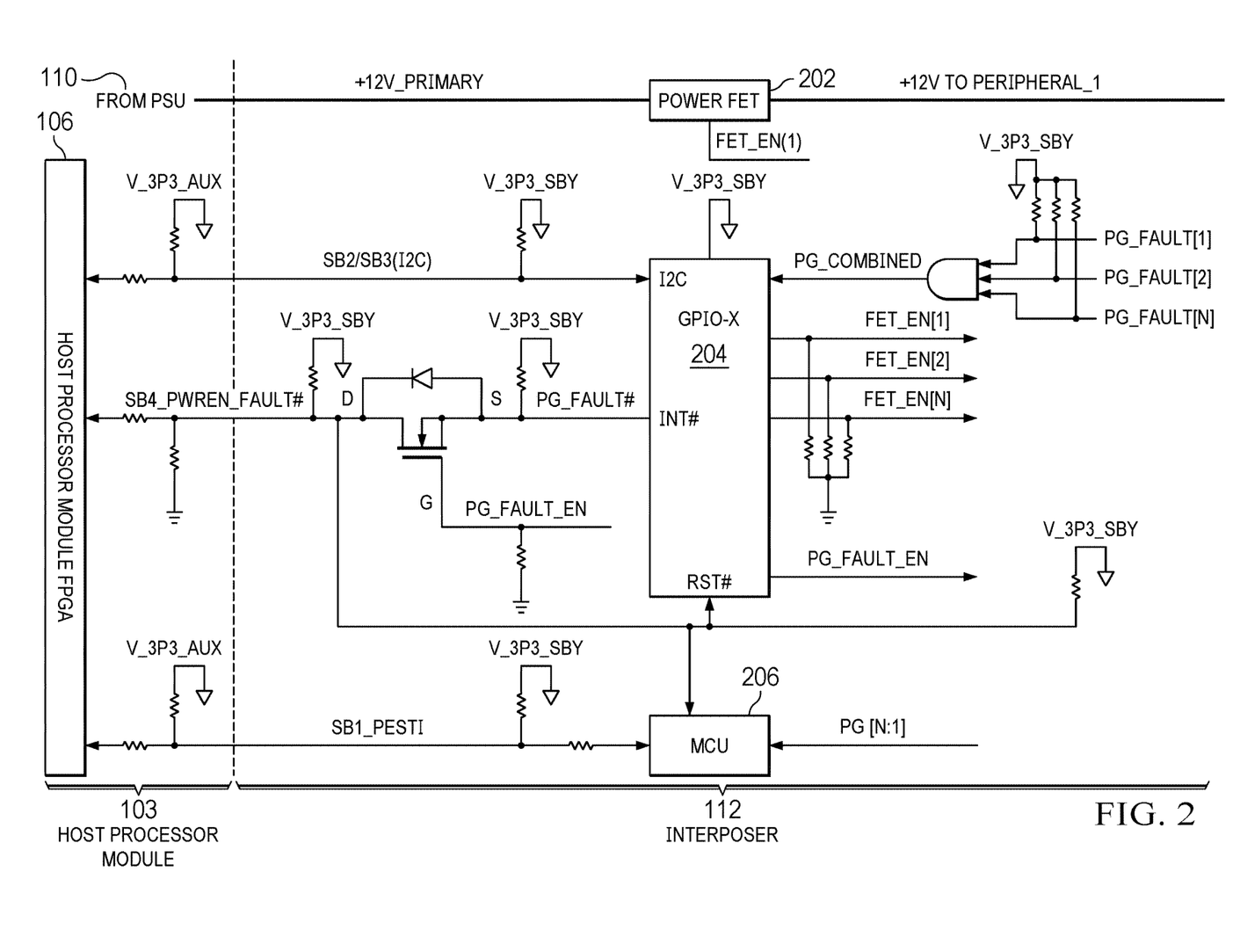
FIG. 2 illustrates a circuit and block diagram of selected components of an interposer coupled to a host processor module field-programmable gate array, in accordance with embodiments of the present disclosure.
Figure 3:
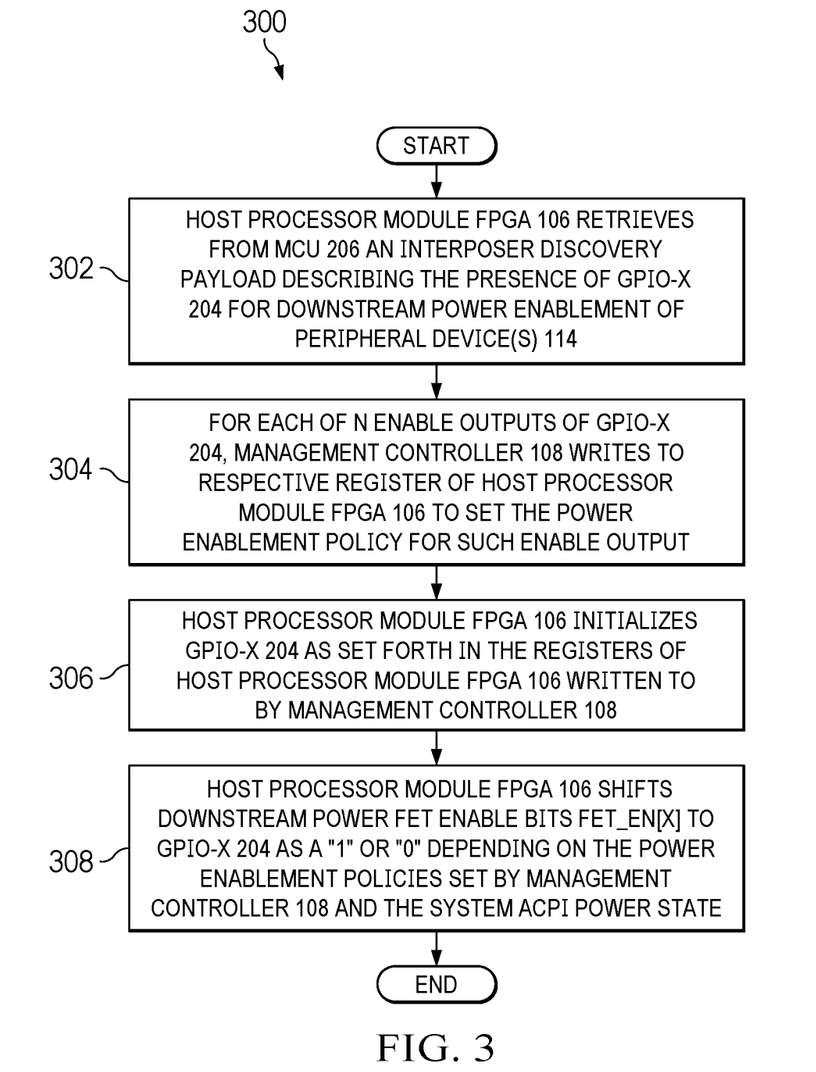
FIG. 3 illustrates a flow chart of an example method for granular and scalable subsystem power controls, fault handling, and field-replaceable unit isolation in a modular information handling system architecture, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input and output ("I/O") devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

An information handling system may include one or more circuit boards operable to mechanically support and electrically connect electronic components making up the information handling system (e.g., packaged integrated circuits). Circuit boards may be used as part of motherboards, memories, storage devices, storage device controllers, peripherals, peripheral cards, network interface cards, and/or other electronic components. As used herein, the term "circuit board" includes printed circuit boards (PCBs), printed wiring boards (PWBs), etched wiring boards, and/or any other board or similar physical structure operable to mechanically support and electrically couple electronic components.

FIG. 1 illustrates a block diagram of an example information handling system 102, in accordance with embodiments of the present disclosure. In some embodiments, information handling system 102 may comprise a server. In these and other embodiments, information handling system 102 may comprise a personal computer. In other embodiments, information handling system 102 may be a portable computing device (e.g., a laptop, notebook, tablet, handheld, smart phone, personal digital assistant, etc.). As depicted in FIG. 1, information handling system 102 may include a host processor module 103, a memory 104 communicatively coupled to host processor module 103, a BIOS 105 communicatively coupled to host processor module 103, a management controller 108 communicatively coupled to host processor module 103, a power supply unit (PSU) 110 for supplying electrical energy to various components of information handling system 102, an interposer 112 communicatively coupled to host processor module 103 and management controller 108, and one or more peripheral devices 114 communicatively coupled to host processor module 103 via interposer 112.

Host processor module 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, host processor module 103 may interpret and/or execute program instructions and/or process data stored in memory 104, BIOS 105, and/or another component of information handling system 102.

As shown in FIG. 1, host processor module 103 may comprise a host processor module field programmable gate array (FPGA) 106. Host processor module FPGA 106 may comprise a programmable system, device, or apparatus within host processor module 103 that may be configured for controlling system power and reset and/or serializing/deserializing input/output communications between host processor module 103 and management controller 108.

Memory 104 may be communicatively coupled to host processor module 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to host processor module 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on host processor module 103 to carry out the functionality of BIOS 105. In these and other embodiments, BIOS 105 may comprise boot firmware configured to be the first code executed by host processor module 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by host processor module 103 and given control of information handling system 102.

Management controller 108 may be configured to provide management facilities for management of information handling system 102. Such management may be made by management controller 108 even if information handling system 102 is powered off or powered to a standby state. Management controller 108 may include any suitable components for carrying out its functionality, including without limitation a processor, memory, and a network interface separate from and physically isolated from an in-band network interface of information handling system 102. In certain embodiments, management controller 108 may include or may be an integral part of a baseboard management controller (BMC), a remote access controller (e.g., a Dell Remote Access Controller or Integrated Dell Remote Access Controller), or an enclosure controller. In other embodiments, management controller 108 may include or may be an integral part of a chassis management controller (CMC).

PSU 110 may include any system, device, or apparatus configured to supply electrical current to one or more information handling resources of information handling system 102. For example, a PSU 110 may provide electrical energy via a main power rail and an auxiliary power rail. The main power rail may generally be used to provide power to information handling resources of information handling system 102 when information handling system 102 is turned on. On the other hand, the auxiliary power rail may generally be used to provide power to certain auxiliary information handling resources when energy is not supplied via the main power rail. For example, the auxiliary power rail may be used to provide power to management controller 108 when electrical energy is not provided to processor 103, memory 104, and/or other information handling resources via the main power rail.

Interposer 112 may include any system, device, or apparatus configured to implement a real-tome power control interface between host processor module FPGA 106 and peripheral device(s) 114, as described in greater detail below.

A peripheral device 114 may include any system, device, or apparatus configured to implement a specific functionality within information handling system 102, and may include without limitation a network interface card, storage device, and/or other suitable device.

In addition to host processor module 103, memory 104, BIOS 105, management controller 108, PSU 110, interposer 112, and peripheral device(s) 114, information handling system 102 may include one or more other information handling resources.

FIG. 2 illustrates a circuit and block diagram of selected components of an interposer 112 coupled to a host processor module FPGA 106, in accordance with embodiments of the present disclosure. In some embodiments, host processor module FPGA 106 may be coupled to interposer 112 via a cabled interface.

As shown in FIG. 2, interposer 112 may include a power field-effect transistor (FET) 202 coupled between a main power rail of PSU 110 and a power input of a peripheral device 114 downstream of interposer 112, such that when power FET 202 is enabled by a FET enable signal FET_EN[x], the downstream peripheral device 114 may be enabled. For purposes of clarity and exposition, only a single power FET 202 is depicted in FIG. 2. However, in actual implementation, interposer 112 may include multiple power FETs 202 each configured to be controlled by a respective FET enable signal FET_EN[x], wherein x may be an integer number between 1 and N, wherein N represents a number of power FETs 202 and FET enable signals FET_EN[x] present in interposer 112.

As also shown in FIG. 2, interposer 112 may also include a general purpose input/output extender (GPIO-X) 204 communicatively coupled to host processor module FPGA 106 such that logic of host processor module FPGA 106 may shift data to GPIO-X 204 to enable and control power delivery to downstream peripheral device(s) 114, as described in greater detail below.

As further shown in FIG. 2, a microcontroller unit (MCU) 206 may be communicatively coupled to host processor module FPGA 106 and GPIO-X 204, and may be configured to perform monitoring and discovery of downstream peripheral device(s) 114, as described in greater detail below.

As additionally shown in FIG. 2, a hardware-controlled (i.e., controlled by host processor module FPGA 106) Inter-Integrated Circuit (I2C) communications bus, labeled as "SB2/SB3 (I2C)" in FIG. 2, may be interfaced between host processor module FPGA 106 and GPIO-X 204. Such communications bus may initialize GPIO-X 204 and write any state changes to the FET enable signals FET_EN[x]. In operation, once policy registers are written by management controller 108, host processor module FPGA 106 may autonomously write FET enable/disable states to GPIO-X 204 accordingly to policy and any system power state change (e.g., see step 308 of FIG. 3, and the description thereof below).

Interposer 112 may also include other logic, passive circuit components, and/or active circuit components for implementing the functionality of interposer 112.

FIG. 3 illustrates a flow chart of an example method 300 for granular and scalable subsystem power controls, fault handling, and field-replaceable unit isolation in a modular information handling system architecture, in accordance with embodiments of the present disclosure. According to certain embodiments, method 300 may begin at step 302. As noted above, teachings of the present disclosure may be implemented in a variety of configurations of information handling system 102 as shown in FIG. 1. As such, the preferred initialization point for method 300 and the order of the steps comprising method 300 may depend on the implementation chosen.

At step 302, host processor module FPGA 106 may retrieve from MCU 206 an interposer discovery payload which may describe the presence of GPIO-X 204 for downstream power enablement of peripheral device(s) 114.

At step 304, for each of N enable outputs of GPIO-X 204 (e.g., FET_EN[1], FET_EN[2], . . . , FET_EN[N]), management controller 108 may write to a respective register of host processor module FPGA 106 to set the power enablement policy for such enable output. For example, possible power enablement policies may include:

00b—always disable;
01b—enable in Advanced Configuration and Power Interface (ACPI) state S0 only;
10b—enable in ACPI states S0 and S5; and
11b—reserved.

At step 306, host processor module FPGA 106 may initialize GPIO-X 204 as set forth in the registers of host processor module FPGA 106 written to by management controller 108. By default, enable outputs may be set to input, and may be set to output based on such registers. Further, by default a power-good fault enable signal PG_FAULT_EN may be set as an input (meaning interrupt is not enabled).

At step 308, once GPIO-X 204 is initialized, host processor module FPGA 106 may shift downstream power FET enable bits FET_EN[x] to GPIO-X 204 as a "1" or "0" depending on the power enablement policies set by management controller 108 and the system ACPI power state (e.g., S0 or S5). In addition, host processor module FPGA 106 may deassert signal PWREN_FAULT to force a global disable of all downstream power FET enable signals FET_EN[x].

For proper operation of the foregoing steps, the interrupt/fault feature must be enabled at the GPIO-X 204. Methods to disable the PG_FAULT signal from propagating to downstream FPGA logic observing signal SB4_PWREN_FAULT may include:
Host processor module FPGA 106 may provide internal masking to ignore signal SB4_PWREN_FAULT during a period after a power FET enable signal FET_EN[x] has been directed to change state;
At GPIO-X 204, signal PG_FAULT_EN is set to output 0; and
At GPIO-X 204, signal PG_COMBINED may be temporarily changed to an output, which may require open-drain AND gate with a pull-up switch between the AND gate.

Although FIG. 3 discloses a particular number of steps to be taken with respect to method 300, it may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102, components thereof, or any other suitable system operable to implement method 300. In certain embodiments, method 300 may be implemented partially or fully in software and/or firmware embodied in computer-readable media.

In addition or in lieu of the foregoing, in an alternative embodiment, MCU 206 may communicate to GPIO-X 204 via an Inter-Integrated Circuit (I2C) interface as a proxy for commands that it receives from management controller 108/host processor module FPGA 106 over a Peripheral Sideband Tunneling Interface (PESTI) wire.

In accordance with the foregoing, using a hardware-to-hardware interface:
logic of host processor module FPGA 106 may shift data to GPIO-X 204 to enable power to downstream devices; and
host processor module FPGA 106 may assert signal SB4_PWREN_FAULT low to disable power to all downstream devices by asserting a reset signal to GPIO-X 204.
Signal PG_FAULT_EN generated by GPIO-X 204 may locally disable all downstream outputs and notify host processor module FPGA 106 of a fault event.

Also in accordance with the foregoing, using a firmware-to-hardware interface, system management firmware of management controller 108 may program registers of host processor module FPGA 106 to control the power enablement policy for each downstream enable signal that forms the hardware-to-hardware shift of data described above.

Further in accordance with the foregoing, using a hardware-to-firmware interface, MCU 206 may latch power-good inputs PG[N:1] at any assertion of a power fault.

Moreover, in accordance with the foregoing, using a firmware-to-firmware interface, system management firmware of management controller 108 may query a target MCU 206 over a PESTI wire to isolate the fault to an individual downstream peripheral device 114 that caused the fault.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a host processor module comprising a host processor field programmable gate array;
a management controller communicatively coupled to the host processor field programmable gate array and configured to provide out-of-band management facilities for management of the information handling system; and
an interposer configured to interface between the host processor field programmable gate array and one or more peripheral devices in order to perform power management and control of the one or more peripheral device, the interposer comprising:
a general purpose input/output extender configured to enable and control power delivery to the one or more peripheral devices; and
a microcontroller unit communicatively coupled to the host processor field programmable gate array and configured to perform monitoring and discovery of the one or more peripheral devices.

2. The information handling system of claim 1, the general purpose input/output extender further configured to enable power to the one or more peripheral devices with independent policy controls for each of the peripheral devices.

3. The information handling system of claim 2, wherein the independent policy controls are based on policy settings communicated from the management controller to the host processor field programmable gate array.

4. The information handling system of claim 1, wherein the general purpose input/output extender is further configured to:
receive a command from the host processor field programmable gate array to disable power to the one or more peripheral devices; and
cause power to be disabled to the one or more peripheral devices in response to the command.

5. The information handling system of claim 1, wherein the microcontroller unit is further configured to monitor fault states of the one or more peripheral devices.

6. The information handling system of claim 5, wherein the microcontroller unit is further configured to communicate information regarding the one or more fault states to the management controller to enable the management controller to identify a peripheral device of the one or more peripheral devices experiencing a fault.

7. A method comprising, in an information handling system comprising a host processor module comprising a host processor field programmable gate array and a management controller communicatively coupled to the host processor field programmable gate array and configured to provide out-of-band management facilities for management of the information handling system:
enabling and controlling, with a general purpose input/output extender integral to an interposer configured to interface between the host processor field programmable gate array and one or more peripheral devices, power delivery to the one or more peripheral devices; and
performing monitoring and discovery of the one or more peripheral devices with a microcontroller unit communicatively coupled to the host processor field programmable gate array.

8. The method of claim 7, further comprising enabling, by the general purpose input/output extender, power to the one or more peripheral devices with independent policy controls for each of the peripheral devices.

9. The method of claim 8, wherein the independent policy controls are based on policy settings communicated from the management controller to the host processor field programmable gate array.

10. The method of claim 7, further comprising:
receiving, with the general purpose input/output extender, a command from the host processor field programmable gate array to disable power to the one or more peripheral devices; and
causing, with the general purpose input/output extender, power to be disabled to the one or more peripheral devices in response to the command.

11. The method of claim 7, further comprising monitoring, with the microcontroller unit, fault states of the one or more peripheral devices.

12. The method of claim 11, further comprising communicating, with the microcontroller unit, information regarding the one or more fault states to the management controller to enable the management controller to identify a peripheral device of the one or more peripheral devices experiencing a fault.

13. An interposer, for use in an information handling system comprising a host processor module comprising a host processor field programmable gate array and a management controller communicatively coupled to the host processor field programmable gate array and configured to provide out-of-band management facilities for management of the information handling system, the interposer configured to interface between the host processor field programmable gate array and one or more peripheral devices in order to perform power management and control of the one or more peripheral device, and the interposer comprising:
a general purpose input/output extender configured to enable and control power delivery to the one or more peripheral devices; and
a microcontroller unit communicatively coupled to the host processor field programmable gate array and configured to perform monitoring and discovery of the one or more peripheral devices.

14. The interposer of claim 13, the general purpose input/output extender further configured to enable power to the one or more peripheral devices with independent policy controls for each of the peripheral devices.

15. The interposer of claim 14, wherein the independent policy controls are based on policy settings communicated from the management controller to the host processor field programmable gate array.

16. The interposer of claim 13, wherein the general purpose input/output extender is further configured to:
receive a command from the host processor field programmable gate array to disable power to the one or more peripheral devices; and cause power to be disabled to the one or more peripheral devices in response to the command.

17. The interposer of claim 13, wherein the microcontroller unit is further configured to monitor fault states of the one or more peripheral devices.

18. The interposer of claim 17, wherein the microcontroller unit is further configured to communicate information regarding the one or more fault states to the management controller to enable the management controller to identify a peripheral device of the one or more peripheral devices experiencing a fault.

* * * * *